3,843,398
CATALYTIC PROCESS FOR DEPOSITING
NITRIDE FILMS
Ronald R. Maagdenberg, P.O. Box 1337,
Sunnyvale, Calif. 94088
No Drawing. Continuation-in-part of abandoned application Ser. No. 49,900, June 25, 1970. This application June 13, 1972, Ser. No. 262,349
Int. Cl. B44d 1/18; C23c 11/00
U.S. Cl. 117—201          12 Claims

ABSTRACT OF THE DISCLOSURE

A process for producing nitride films using $N_2$ as the nitrogen source and a non-nitrogen bearing Lewis base as a catalyst. The process allows for the formation of graded and sandwiched structures with oxide films by controlling the concentration of the reactants.

---

This application is a continuation-in-part of my application filed June 25, 1970, Ser. No. 49,900 now abandoned.

BACKGROUND OF THE INVENTION

Field of the Invention

This invention relates generally to the formation of nitride films by a catalytic process and more particularly to the formation of high purity nitride and/or oxynitride films for use as surface passivants for dielectric isolation and/or as diffusion masking agents in semiconductor device fabrication. The use of the high purity nitride and oxynitride films formed herein also may be used for gate insulators for field effect transistors and for passivation of metal chips or hermetic sealers for semiconductor devices.

Description of the Prior Art

Nitride films, especially silicon nitride films, are often used as passivants or masking agents for semiconductor devices. At the present time silicon nitride films for semiconductor applications are mainly produced by the reaction of nitrogen compounds of amonia ($NH_3$) and silane ($SiH_4$) at temperatures of about 700–1,000° C., utilizing thermal energy. Other general techniques utilize a nitrogen containing compound and a silicon compound (e.g., $SiH_4$ or $SiCl_4$) to form silicon nitride. It has been found that the density of a silicon nitride film increases with increasing temperature and a film grown at lower temperatures can be densified at higher temperatures.

It has been found that nitride films formed by the reaction of ammonia and a silicon compound have poor characteristics and properties. For example, the films formed have high conductance and are not good insulators. Also the composition obtained is questionable (not true stoichiometric $Si_3N_4$) and the composition is often difficult to reproduce consistenly.

The prior art does not teach any method for producing a silicon nitride film at low temperature from $N_2$, which is the purest form of a nitrogen source. Various of the known prior art attempts to utilize only gaseous $N_2$ to form silicon nitride have required temperatures of about 1,200° C. to 1,500° C. and did not involve the use of non-nitrogen bearing Lewis bases as catalysts.

None of the prior art processes for forming silicon nitride layers or other similar nitride layers have allowed the formation of graded structure or a sandwiched structure (e.g., Si—$SiO_2$—$Si_3N_4$) by an easily controllable catalytic process.

Normally, the activation energy required for the prior art methods of producing various types of nitride films was supplied by thermal excitation such as by using a furnace or infrared lamps. Also, the prior art method often required low pressure and/or rf discharge techniques in order to grow low temperature $Si_3N_4$.

SUMMARY OF THE INVENTION

The present invention involves a simplified but highly effective process for obtaining nitride films, (e.g., silicon nitride and silicon oxynitride) using gaseous $N_2$ and a non-nitrogen bearing Lewis base catalyst capable of furnishing an electron pair to form a co-valent bond. The present process provides for the formation of nitride films without the use of ammonia thereby overcoming various poor characteristics and properties heretofore associated with the reaction of ammonia and a silicon compound. The present invention permits the use of pure gaseous nitrogen as the sole nitrogen source of the reacting agents. The invented process allows graded and sandwiched film structures including oxides (e.g., silicon dioxide) to be formed by controlling the amount and/or ratios of mole reactant materials in steps during the reaction. The invented technique is specifically illustrated with reference to silicon substrates with silicon nitride, silicon oxynitride and silicon dioxide films for purposes of example. However, the utlization of the invented process is equally applicable to other semiconductors such as germanium, gallium arsenide and other Group III–V and Group II–VI materials with comparable films. This invented process is particularly useful with gallium arsenide because of the low temperature processing techniques which prevent disassociation of the compound at higher temperatures.

Recently, the use of silicon nitride films in the semiconductor industry has become widespread and of great importance to the industry. Presently, silicon nitride films are used in diffusion masking, surface passivation and for dielectric isolation. The present invention allows gaseous $N_2$ to be used as the sole nitrogen source in order to obtain purer silicon nitrite layers than is now available with any of the known prior art methods. Further, by utilizing a non-nitrogen bearing Lewis base (any substance with a free pair of electrons that is capable of sharing such electrons with an electron acceptor) as a catalyst, the excitation means now required to produce a silicon nitride film is drastically modified. The invented method allows silicon nitride to be produced at lower temperatures (e.g., about 20° C. to 800° C.) and at relatively higher pressure (e.g., atmospheric pressure or greater) when compared to the reaction conditions now required for low temperature processes. Particularly excellent results have been obtained in controlling the process at 200° C. to 600° C.

The invented process has also been found to yield thicker films at comparable temperatures per unit time thus making it more efficient than the prior art methods. The advantage here is that films can be grown at lower temperatures than with prior methods. Also, a graded structure of successive differing layers can be formed during a single set up merely by varying the mole ratio of active reactants. For example, by proper adjustment of the mole ratio of oxygen relative to silane $SiH_4$, in successive steps, and by utilizing a suitable temperature (e.g., about 500–800° C.) a graded type structure of Si—$SiO_2$—$Si_3N_4$ can be obtained. This graded structure is particularly useful in integrated circuit applications for ease of acid etching windows, surface passivation and as a masking agent against diffusants, especially $Na^+$ ions. Also, silicon oxynitride films can be produced by suitable control of the mole ratio of the reactive constituents to allow formation at the same time of both the oxide and nitride.

DESCRIPTION OF THE PREFERRED METHOD

One of the chief advances of the present invention over the prior art methods is the ability to use a non-nitrogen bearing Lewis base catalyst as the mode of excitation to provide the activation energy required for the nitride or oxynitride to form in a suitable reaction. For purposes of describing the preferred process, oxygen will be used as the catalyst. It should be understood that the basis and theory upon which the present invented method is believed to operate is equally applicable to other non-nitrogen bearing Lewis base catalytic substance which has an excess of electrons. The covalent bonds formed by having a pair of electrons shared by two atoms and counting as part of the outer valance shell of each of the atoms is believed to provide the basis by which the Lewis bases are able to aid as catalysts in the postulated reaction while nitrogen gas serves as the sole nitrogen source in the reaction.

Using oxygen as the catalyst, it is believed that the following equations substantially reflect the reaction theory upon which the invented process operates when applied to the formation of pure silicon nitride:

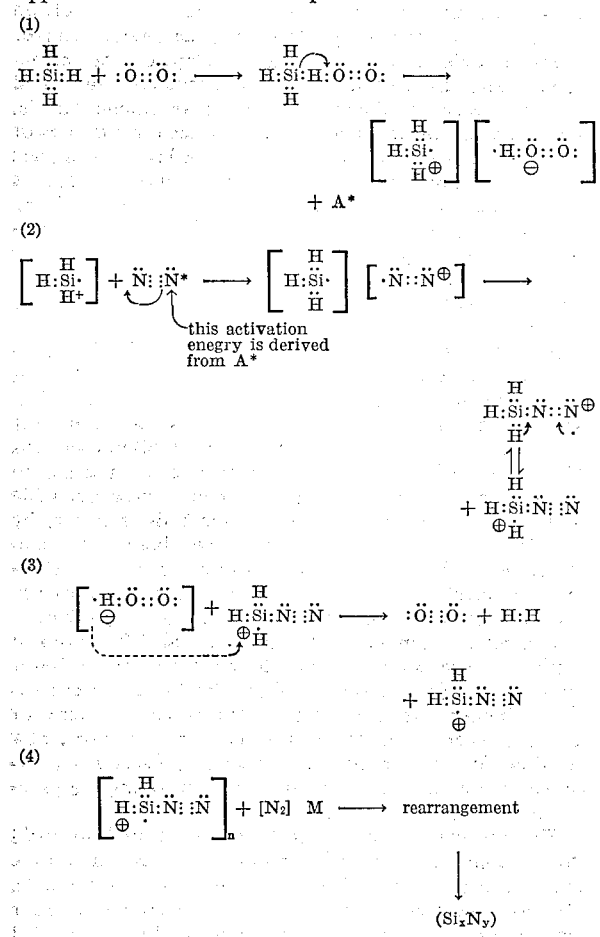

Where
$n$=finite number of silicon-nitrogen complex
$m$=finite number of nitrogen molecules
$x \sim 3$
$y \sim 4$
$N_2^*$=activated nitrogen molecule
$A^*$=activation energy of about 8 kcal./mole.

It is believed that the reason the invented method of forming $Si_3N_4$ can be accomplished at temperatures as low as room temperature is because the reaction of $SiH_4+O_2$ in Equation (1) above yields a heat reaction believed to be about 8 kcal./mole.

In the *R.C.A. Review* (December, 1968) at page 626, K. Strater calculated the activation energy of a silane-oxygen reaction to be about 8 kcal./mole in forming $SiO_2$ at about 150° C. and this appears to be a reasonable process as explained by the theoretical equations (1) to (4) (recited above) for supplying the activation energy for reacting $SiH_4$ with gaseous $N_2$. Thus, it is believed that the $O_2$, or any other suitable non-nitrogen bearing Lewis base, provides an activation energy which is sufficient to allow the reaction of $SiH_4$ with $N_2$ to occur at much lower temperatures and higher pressures than has heretofore been possible.

Previously, only $NH_3$—$SiH_4$ systems have been used for obtaining relatively low temperature (lower limit temperature about 800° C.) systems for producing $Si_3N_4$. Further, the latter system using $NH_3$ did not yield the higher purity $Si_3N_4$ which is obtained in the invented process by using pure $N_2$ gas. The $NH_3$ process is detrimental to temperature stability at any voltage bias as measured by capacitance-voltage due to formation of hydrogenated species which are trapped within and/or become part of the $Si_3N_4$ structure.

The formation of $SiO_2$ can be suppressed by controlling the oxygen concentration. For example, when the mole ratio of $O_2$ (Lewis base) to $SiH_4$ is less than 1, it has been found that substantially no $SiO_2$ is formed. When it is desired to obtain a sandwiched structure such as an $SiO_2$ layer over a silicon substrate which is gradually changed in situ to $Si_3N_4$ to form an $Si$—$SiO_2$—$Si_3N_4$, it has been found that the reaction to produce $SiO_2$ can be easily obtained by merely raising the oxygen concentration relative to the silane and keeping the temperature and pressure constant. For example, a mole ratio of oxygen to silane greater than 1, results in forming $SiO_2$ at temperatures above 25° C. After the $SiO_2$ layer is formed the oxygen to silane mole ratio is again adjusted to 0.4 or less to allow the formation of $Si_3N_4$. For a graded staructure, one starts with more oxygen than silane to get $SiO_2$ and gradually reduces the oxygen to realize an $O_2/SiH_4$ mole ratio of 0.4 or less to realize pure silicon nitride. Silicon oxynitride is realized by an oxygen to silane mole ratio of 0.4–1.0.

If desired, the pure $Si_3N_4$ layer obtained may be utilized for diffusion masking, surface passivation and/or dielectric isolation. The pure $Si_3N_4$ film formed by the present invention is particularly effective in preventing $Na^+$ ion migration. Because of the low temperature range which can be used in the present process, a dense $Si_3N_4$ film may be applied after aluminum interconnections have been made. Sandwiched structures having a silicon nitride layer over silicon dioxide have many applications in the semiconductor field. For example, field effect and memory devices often utilize a sandwiched structure of $Si_3N_4$ over $SiO_2$.

A sandwiched structure having various alternate layers of $SiO_2$ and $Si_3N_4$ (e.g., $Si$—$SiO_2$—$Si_3N_4$—$SiO_2$—$Si_3N_4$, etc.) may be easily formed in situ by merely varying the mole ratio of $O_2$ to $SiH_4$ as described above.

The present invention does not require low pressure and/or vacuum processing. The invented method can be successfully carried out in atmospheric pressure conditions (about 15 p.s.i.g.), thus making the apparatus used much simpler and less expensive.

The reaction rates would not be greatly enhanced by lowering the pressure, unless a closed system is utilized. Increased pressures (above atmospheric pressure) would tend to enhance the reaction rate due to the formation of a solid phase. Temperature is not critical beyond certain minima points (e.g. 77° K. or lower). The free energy of formation of $SiO_2$ is so large that if $SiH_4$ and $O_2$ are present in any significant quantities a spontaneous reaction results with liberation of vast amounts of energy. The $N_2$ acts as a diluent and gets activated in the process. That is, the $N_2$ absorbs the liberated energy from the $SiH_4+O_2$ and is raised from ground state to some excited state which now is reactive enough to form the nitride or oxynitride. The normal mode of energy is thermal but it is believed that if one properly activates the process, constituents, nitride formation is possible at very low temperatures.

The invented method presents less problems in handling the processed material. The invented method is also simpler, less expensive and easier to control than previous techniques using radio frequency excitation in "sputtering" systems for obtaining nitrides.

While the various parameters of the invention process can be adjusted to obtain the desired film thickness, temperature, etc., the following example illustrates a particular set of conditions which has produced a highly controllable process for producing high purity $Si_3N_4$ films.

EXAMPLE

| | |
|---|---|
| Flow rate of gaseous $N_2$ | 30 liters/minute. |
| Flow rate of gaseous $O_2$ | 10 cc./minute. |
| Flow rate of $SiH_4$ | 28 cc./minute. |
| Temperature | 800° C. |
| Deposition time | 5 minutes. |
| Film thickness obtained | 6,000 A. |
| Mole ratio of $O_2/SiH_4$ | Approx. 0.4. |
| Pressure | Approx. 1 atmosphere. |

It should be understood that the invented process can be used with other silicon containing compounds such as $SiCl_4$ or metal hydrides. Other non-nitrogen bearing Lewis bases may be used (e.g., halogens) to provide the desired catalytic action illustrated and described above. Also, as previously mentioned, the present invention is applicable with other semiconductor materials and substrates such as germanium, gallium, arsenide and other Group III–V and Group II–VI materials. The term "substrates" as used in the description of this invention shall also be understood to include any regrowth of substrate material. Further, other films such as germanium nitride and/or germanium oxynitride, etc., may aslo be formed utilizing the invented catalytic process.

In general, the standard techniques and methods common in the semiconductor industry for preparing substrates, masking, etching and passivating may be used in conjunction with the present invention. While certain specific details have been disclosed herein for illustrative purposes, it will be apparent to those skilled in the art that various modifications may be made within the teachings and without departing from the scope of the instant invention.

What is claimed is:

1. In semiconductor device fabrication a method for producing nitride films of a given semiconductor material, comprising the steps of:
    (a) providing a compound containing a given semi-conductor material of silicon or germanium;
    (b) providing nitrogen gas;
    (c) providing an oxygen gas catalyst, the mole ratio of the catalyst to said compound being less than 1;
    (d) providing a semi-conductive substrate;
    (e) simultaneously reacting the compound containing the given semiconductor material with the nitrogen gas in the presence of the catalyst to form nitride; and
    (f) depositing said nitride on the substrate to form a nitride of said semiconductor material on said substrate.

2. The method of claim 1 in which the nitride film of said given material is selected from the group consisting of silicon nitride, silicon oxynitride, germanium nitride and germanium oxynitride.

3. The method of claim 1 in which said substrate is silicon, and said film is silicon nitride.

4. The method of claim 1 in which the reaction is conducted at a temperature within the range of approximately 20° C.–800° C. and at approximately atmospheric pressure.

5. The method of claim 3 in which the catalyst is oxygen gas and the mole ratio of the catalyst to the silicon containing compound does not exceed 1.

6. The method of claim 5 in which the silicon containing compound is silane.

7. In semiconductor device fabrication, a method for producing alternate layers of oxide and nitride films of a given semiconductor material;
    (a) providing a compound containing a given semiconductor material of silicon or germanium;
    (b) providing nitrogen gas;
    (c) providing an oxygen gas catalyst;
    (d) providing a semiconductive substrate;
    (e) simultaneously reacting the compound containing the given semiconductor material with the nitrogen gas in the presence of the oxygen catalyst;
    (f) alternately adjusting the mole ratio of said oxygen to the compound containing said given semiconductor material within a first range of a second range, the first range of the mole ratio value being greater than 1 to form oxide and the second range being less than one to form a nitride; and
    (g) alternately depositing said formed oxide and nitride on the substrate to form alternate oxide and nitride films on said semiconductor material.

8. The method of claim 7 in which
the temperature and pressure are maintained constant during the reaction.

9. The method of claim 7 in which
the compound is silane;
said substrate is silicon; and
the mole ratio of said oxygen to silane is alternately varied to within said first, second and a third range wherein the first range of mole ratio is greater than 1, the second range of mole is 0.4 to 1 to form silicon oxynitride; and the third range is of a value of 0.4 or less to form silicon nitride.

10. In a semiconductor device fabrication, a method for producing nitride films of a given semiconductor material over a silicon dioxide film on a substrate, comprising the steps of:
    (a) providing silane;
    (b) providing nitrogen gas;
    (c) providing oxygen gas;
    (d) providing a silicon substrate;
    (e) simultaneously reacting the silane with the nitrogen gas in the presence of the oxygen with the mole ratio of oxygen to silane being mantained at a value greater than 1 to form silicon dioxide;
    (f) depositing said silicon dioxide on said silicon substrate to form a silicon dioxide film;
    (g) adjusting the mole ratio of the oxygen to silane to a value less than 1 while maintaining the gaseous nitrogen flow to form a silicon nitride; and
    (h) then depositing said silicon nitride on the silicon dioxide film to form a silicon nitride film on said silicon dioxide film.

11. The method of claim 10 in which the temperature of said reactions are conducted at a temperature of approximately 500° C.–800° C. and atmospheric pressure.

12. The method of claim 11 in which
after depositing said silicon nitride film the mole ratio of oxygen to silane is adjusted to be in excess of 1 to form a second silicon dioxide film, and
then depositing said second silicon dioxide film over said silicon nitride layer to form a sandwiched silicon-silicon dioxide - silicon nitride - silicon dioxide configuration.

References Cited

UNITED STATES PATENTS 3,769,104   10/1973   Ono et al. _____ 117—201

LEON D. ROSDAL, Primary Examiner

M. F. ESPOSITO, Assistant Examiner

U.S. Cl. X.R.

117—106 R, 106 A, Dig. 12